(12) United States Patent
Nania et al.

(10) Patent No.: US 11,325,451 B2
(45) Date of Patent: May 10, 2022

(54) TAILGATE ASSEMBLY HAVING A DOOR AND METHOD OF PROVIDING ACCESS TO A CARGO BED

(71) Applicant: Ford Global Technologies, LLC, Dearborn, MI (US)

(72) Inventors: Adrian Nania, Rochester, MI (US); Amol Borkar, Nagpur (IN)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/918,335

(22) Filed: Jul. 1, 2020

(65) Prior Publication Data
US 2022/0001728 A1 Jan. 6, 2022

(51) Int. Cl.
*B60J 5/10* (2006.01)
*B60R 3/02* (2006.01)
*B62D 33/027* (2006.01)

(52) U.S. Cl.
CPC .............. *B60J 5/108* (2013.01); *B60R 3/02* (2013.01); *B62D 33/0273* (2013.01)

(58) Field of Classification Search
CPC ......... B60J 5/108; B60R 3/02; B62D 33/0273
See application file for complete search history.

(56) References Cited

U.S. PATENT DOCUMENTS

| | | | |
|---|---|---|---|
| 7,165,800 B2 | 1/2007 | Thiele et al. | |
| 8,246,098 B2 * | 8/2012 | Cheung | B62D 33/0273 296/146.12 |
| 8,348,325 B2 * | 1/2013 | Hausler | B62D 33/0273 296/62 |
| 8,740,279 B1 | 6/2014 | McGoff et al. | |
| 8,919,853 B2 | 12/2014 | Krishnan et al. | |
| 10,308,291 B2 * | 6/2019 | Seki | B62D 33/0276 |
| 11,208,157 B2 * | 12/2021 | Borkar | B62D 33/037 |
| 2008/0106106 A1 | 5/2008 | Lavoie | |
| 2009/0183433 A1 | 7/2009 | Cheung et al. | |

OTHER PUBLICATIONS

U.S. Appl. No. 16/700,365, filed Dec. 2, 2019.

* cited by examiner

*Primary Examiner* — D Glenn Dayoan
*Assistant Examiner* — Melissa Ann Bonifazi
(74) *Attorney, Agent, or Firm* — Vichit Chea; Carlson, Gaskey & Olds, P.C.

(57) ABSTRACT

A tailgate assembly for a vehicle includes, among other things, a frame sub-assembly that includes a driver side section, a passenger side section, and a connection member coupling the driver side section to the passenger side section. The assembly further includes a door sub-assembly disposed between the driver side section and the passenger side section. The door sub-assembly and the frame sub-assembly are pivotable together about a first axis between a tailgate closed position and a tailgate open position. The door sub-assembly is pivotable relative to the frame sub-assembly about a second axis between a door closed position and a door open position. The door sub-assembly in the door open position provides a cargo bed access opening that extends vertically downward at least as far as a floor of the cargo bed.

19 Claims, 6 Drawing Sheets

TAILGATE ASSEMBLY HAVING A DOOR AND METHOD OF PROVIDING ACCESS TO A CARGO BED

TECHNICAL FIELD

This disclosure relates generally to a tailgate assembly for a vehicle and, more particularly, to a tailgate assembly having a door that can be opened to, among other things, help a user access cargo within a cargo bed of the vehicle.

BACKGROUND

Vehicles, such as pickup trucks, include a cargo bed. A tailgate assembly can enclose one end of the cargo bed when the tailgate assembly is in the closed position. The tailgate assembly can pivot to the open position where the tailgate assembly is substantially horizontal and aligned with a floor of the cargo bed.

SUMMARY

A tailgate assembly for a vehicle according to an exemplary aspect of the present disclosure includes, among other things, a frame sub-assembly that includes a driver side section, a passenger side section, and a connection member coupling the driver side section to the passenger side section. The assembly further includes a door sub-assembly disposed between the driver side section and the passenger side section. The door sub-assembly and the frame sub-assembly are pivotable together about a first axis between a tailgate closed position and a tailgate open position. The door sub-assembly is pivotable relative to the frame sub-assembly about a second axis between a door closed position and a door open position. The door sub-assembly in the door open position provides a cargo bed access opening that extends vertically downward at least as far as a floor of the cargo bed.

In another example of the foregoing assembly, the first axis is transverse to the second axis.

In another example of any of the foregoing assemblies, the first axis is a horizontally extending axis and the second axis is a vertically extending axis.

In another example of any of the foregoing assemblies, the tailgate is vertically aligned when in the tailgate closed position. The tailgate is horizontally aligned when in the tailgate open position.

In another example of any of the foregoing assemblies, the driver side section includes a driver side outer panel, the passenger side section includes a passenger side outer panel, and the door sub-assembly includes a door outer panel. No portion of the door outer panel horizontally overlaps with any portion of the driver side outer panel or the passenger side outer panel.

Another example of any of the foregoing assemblies includes a tailgate step that is at least partially retractable within the door sub-assembly. The tailgate step is extendable to a stepping position when the door sub-assembly and the frame sub-assembly are in the tailgate open position.

Another example of any of the foregoing assemblies includes a bumper step. A longitudinal centerline of the vehicle extends through the bumper step and the cargo bed access opening.

Another example of any of the foregoing assemblies includes a step assembly having a flip step moveable between a stowed position and a flipped position. The flip step in the flipped position provides a step surface for a user.

In another example of any of the foregoing assemblies, the flip step includes ribbed support structure on the step surface.

In another example of any of the foregoing assemblies, the flip step includes a channel configured to receive at least a portion of a trailer hitch when the flip step is in the flipped position.

In another example of any of the foregoing assemblies, the step assembly having the flip step is adjacent a bumper step.

In another example of any of the foregoing assemblies, at least one gooseneck hinge pivotably connects the door sub-assembly to the frame sub-assembly.

Another example of any of the foregoing assemblies includes a tailgate step that at least partially retracts within the door-subassembly when in a stowed position.

In another example of any of the foregoing assemblies, the door sub-assembly includes a handle and button that is actuated to initiate a door open request. The door-sub assembly further includes a button that is actuated to initiate a tailgate open request.

A method of providing access to a cargo bed of a vehicle according to another exemplary aspect of the present disclosure includes a step of providing a tailgate assembly that includes a door sub-assembly and a frame sub-assembly, and pivoting the door sub-assembly relative to the frame sub-assembly to provide a cargo bed access opening. The cargo bed access opening extends vertically downward at least as far as a floor of the cargo bed.

Another example of the foregoing method includes a step of unlatching the door sub-assembly from the frame sub-assembly to permit the pivoting.

Another example of any of the foregoing methods includes permitting the unlatching when the tailgate assembly is in a tailgate closed position and preventing the unlatching when the tailgate is in a tailgate open position.

Another example of any of the foregoing methods includes permitting the tailgate assembly to pivot from a tailgate closed position to a tailgate open position when the door sub-assembly is in the door closed position, and preventing the tailgate assembly from pivoting from the tailgate closed position to the tailgate open position when the door sub-assembly is in the door open position.

Another example of any of the foregoing methods includes, when the door-subassembly is in a door closed position, pivoting the tailgate assembly to a tailgate open position, and extending a tailgate step from a stowed position into a stepping position. The tailgate step in a stowed position is at least partially retracted within the door-sub-assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary tailgate assemblies that include a door. The door can be opened to provide an opening that helps a user to access cargo within a cargo bed, among other things.

Figure 1:
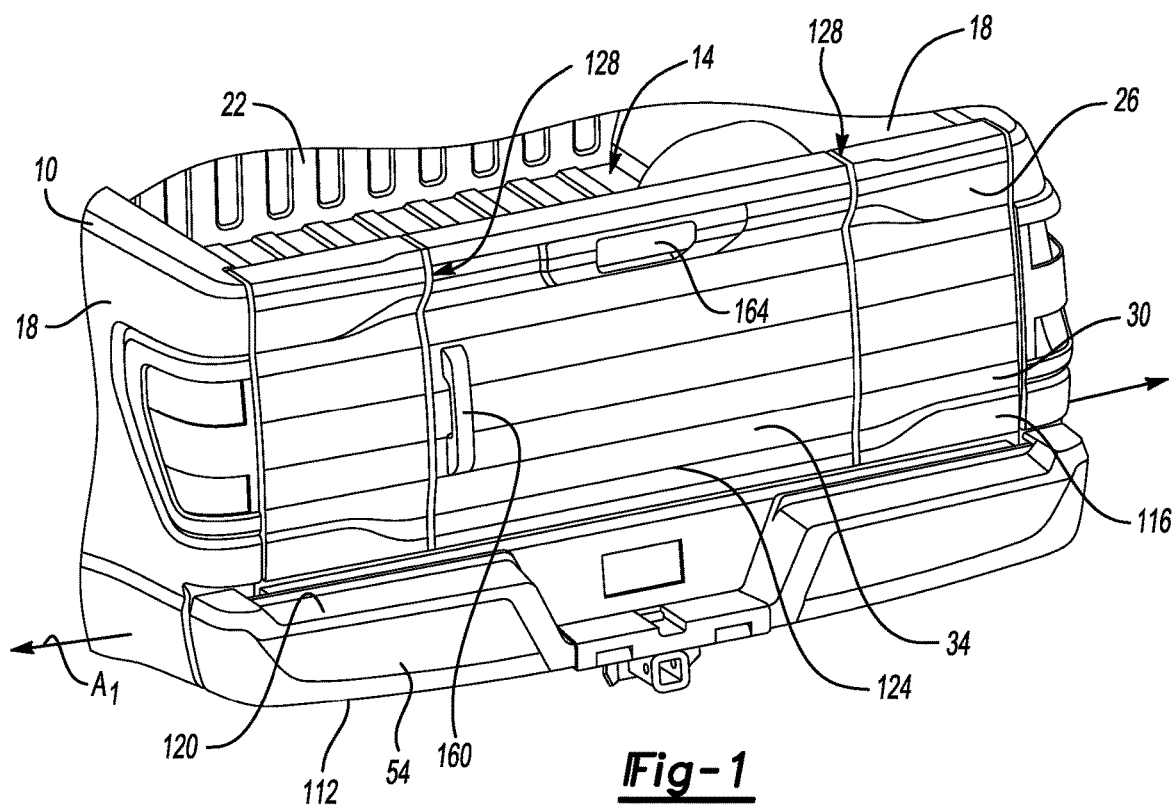
FIG. 1 illustrates a rear perspective view of a pickup truck having a cargo bed and a tailgate assembly in a tailgate closed position.

FIG. 1 illustrates a vehicle 10, here a pickup truck, having a cargo bed 14 that is defined by a pair of sidewalls 18, a front wall 22, and a tailgate assembly 26 according to an exemplary aspect of the present disclosure.

The tailgate assembly 26 includes, among other things, a frame sub-assembly 30 and a door sub-assembly 34.

Figure 2:
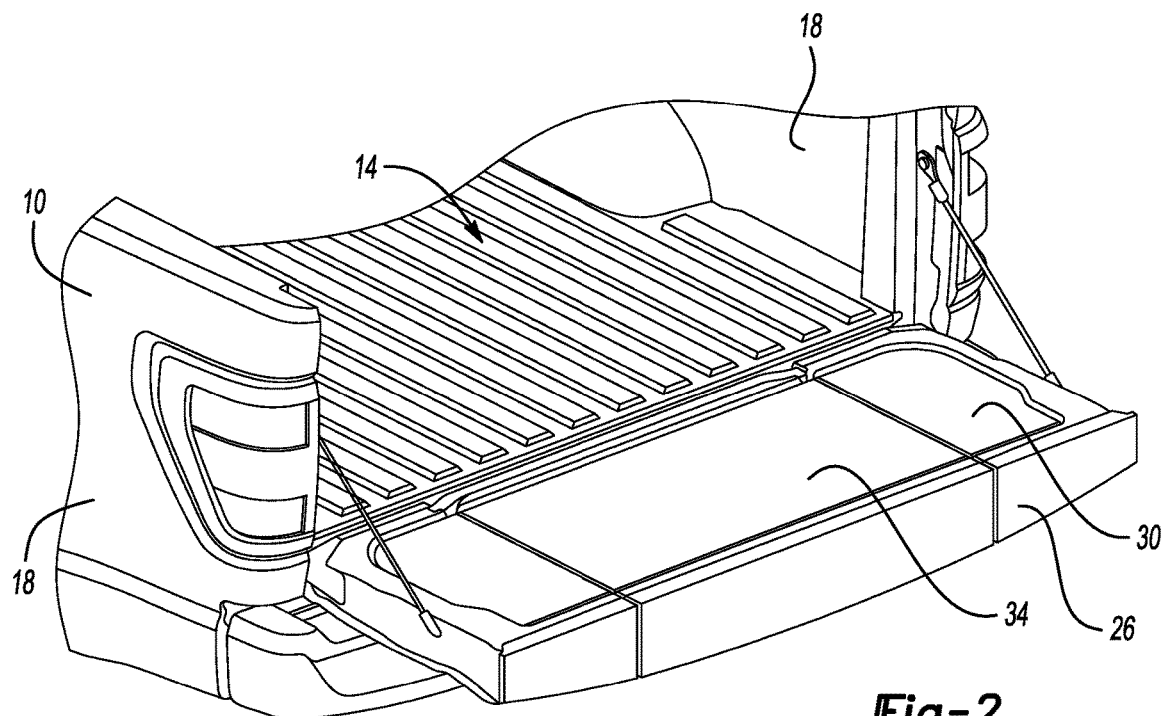
FIG. 2 illustrates a rear perspective view of the tailgate assembly in a tailgate open position.

The tailgate assembly 26 is pivotable about a first axis $A_1$ relative to the cargo bed 14 between a tailgate closed position shown in FIG. 1 and a tailgate open position shown in FIG. 2. The example tailgate assembly 26 is vertically aligned when in the tailgate closed position and horizontally aligned when in the tailgate open position. Vertical and horizontal, for purposes of this disclosure, are with reference to ground in the ordinary orientation of the vehicle 10 during operation.

The door-sub assembly 34 is in a door closed position and is latched to the frame sub-assembly 30 when the frame sub-assembly 30 and the door sub-assembly 34 are pivoted between the tailgate closed position and the tailgate open position. Thus, the frame sub-assembly 30 and the door sub-assembly 34 pivot together when the tailgate assembly 26 are transitioned back and forth between the tailgate closed position and the tailgate open position.

Figure 3:
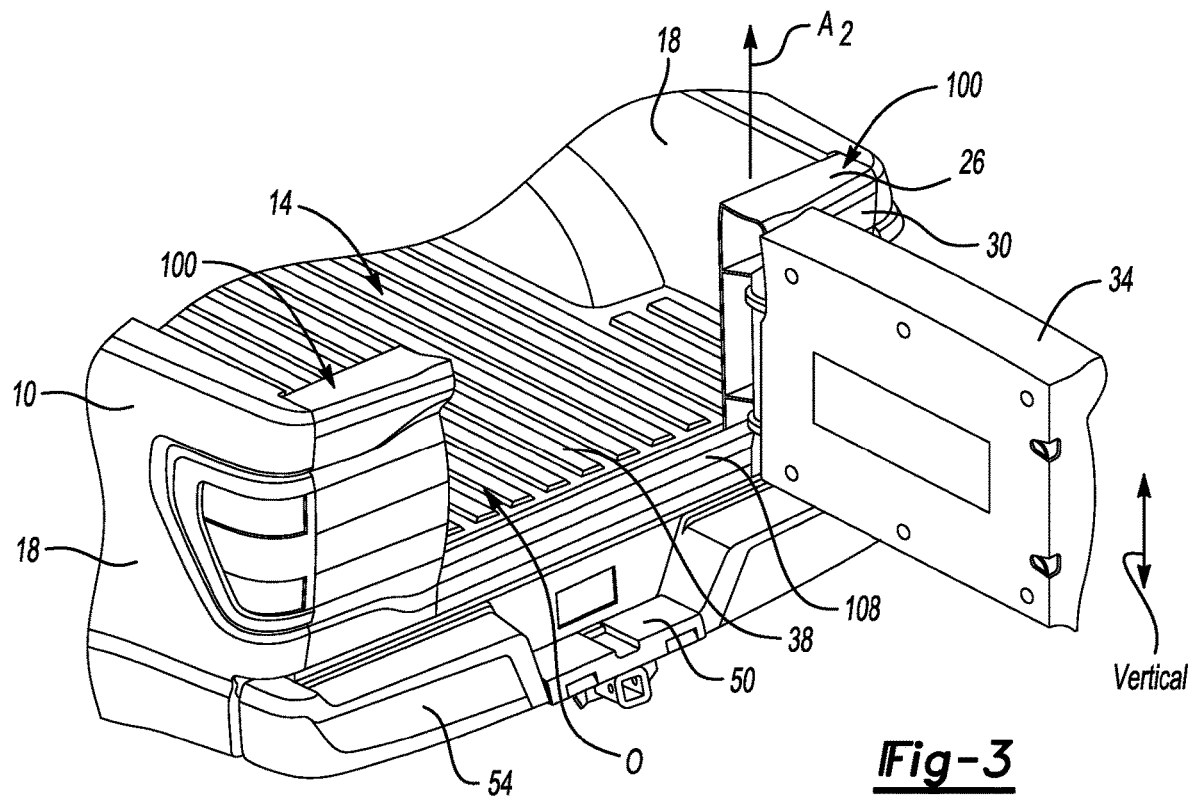
FIG. 3 illustrates a rear perspective view of the tailgate assembly of FIG. 1 with a door subassembly of the tailgate assembly in a door open position.

When in the tailgate closed position, the door sub-assembly 34 is pivotable relative to the frame sub-assembly 30 about a second axis $A_2$ between a door closed position shown in FIG. 1 and a door open position shown in FIG. 3. The first axis $A_1$ is a horizontally extending axis in this example. The second axis $A_2$ is transverse to the first axis $A_1$ and is a vertically extending axis in this example.

The door sub-assembly 34 in the door open position provides a cargo bed access opening O. In this example, the cargo bed access opening O extends vertically downward at least as far as a floor 38 of the cargo bed 14.

Figure 4:
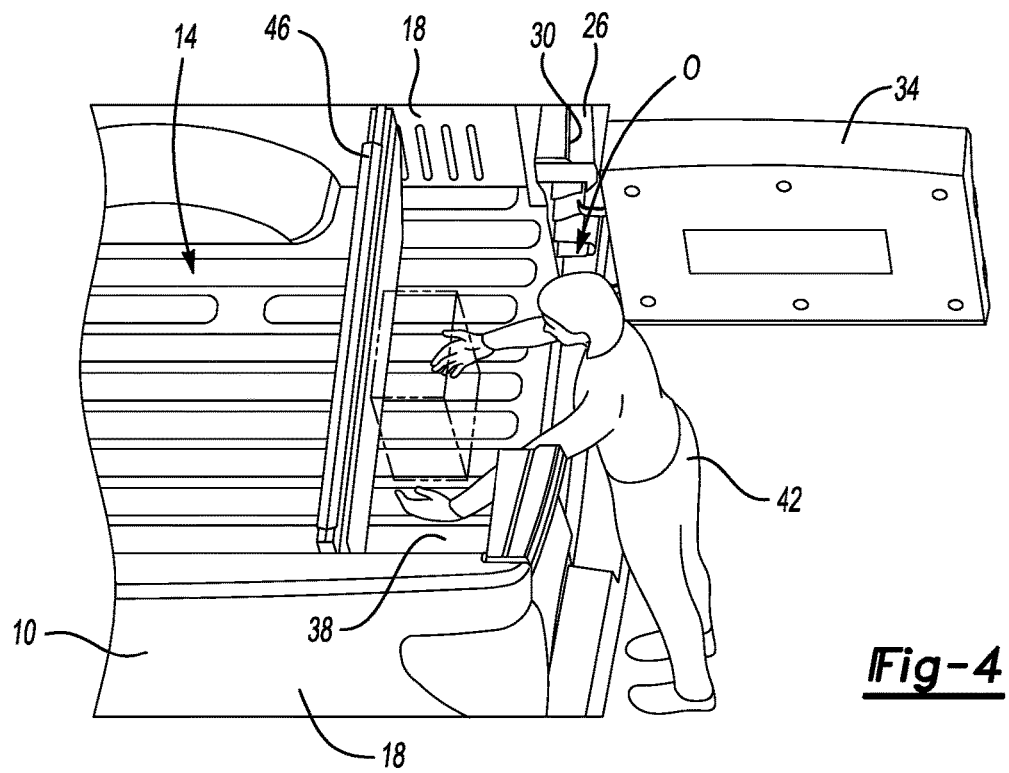
FIG. 4 illustrates a rear and top perspective view of the tailgate assembly of FIG. 1 with the door subassembly of the tailgate assembly in the door open position.

As shown in FIG. 4, a user 42 can access the cargo bed 14 through the cargo bed access opening O provided by the door sub-assembly 34 in the door open position. Placing the door sub-assembly 34 in the door open position allows the user 42 to move closer to the cargo bed 14 than, for example, if the tailgate assembly 26 were moved to the tailgate open position of FIG. 2.

In FIG. 4, a cargo management divider panel 46 is engaged within the cargo bed 14 to help confine cargo to a rear of the cargo bed 14. The cargo management divider panel 46 can help to confine cargo and make sure cargo does not shift forward toward the front wall 22.

The cargo bed access opening O can also provide clearance for the user 42 to enter the cargo bed 14 to retrieve cargo. When entering the cargo bed 14, the user 42 can place their foot on a bumper step 50 within a bumper 54 of the vehicle 10. The user 42 can then step up into the cargo bed 14. The user may grasp an upper surface of the frame sub-assembly 30 when stepping up into the cargo bed 14 through the cargo bed access opening O.

The bumper step 50 and the cargo bed access opening O are both disposed at a centerline of the vehicle 10. The user 42 is thus able to readily appreciate that the bumper step 50 and the cargo bed access opening O can be utilized to enter the cargo bed 14.

In the exemplary embodiment, the tailgate assembly 26 with the single door sub-assembly 34 simplifies the process of entering the cargo bed 14 through the cargo bed access opening O. The user 42 does not need to choose which door (from among several doors) to open in order to enter the cargo bed 14. Further, since the door-subassembly 34 does not extend from the sidewall 18 on the driver side all the way to the sidewall 18 on the passenger side, the user 42 can be standing behind the vehicle 10 and still be able to open the door sub-assembly 34. This can help to shield the user 42 from passing traffic, for example.

As the cargo bed access opening O extends vertically downward at least as far as the floor 38, the user 42 has a relatively clear path to step up into the cargo bed 14 or to load cargo into the cargo bed 14. That is, the user 42 is not required to step over any portion of the tailgate assembly 26 and then down onto the floor 38.

Figure 5:
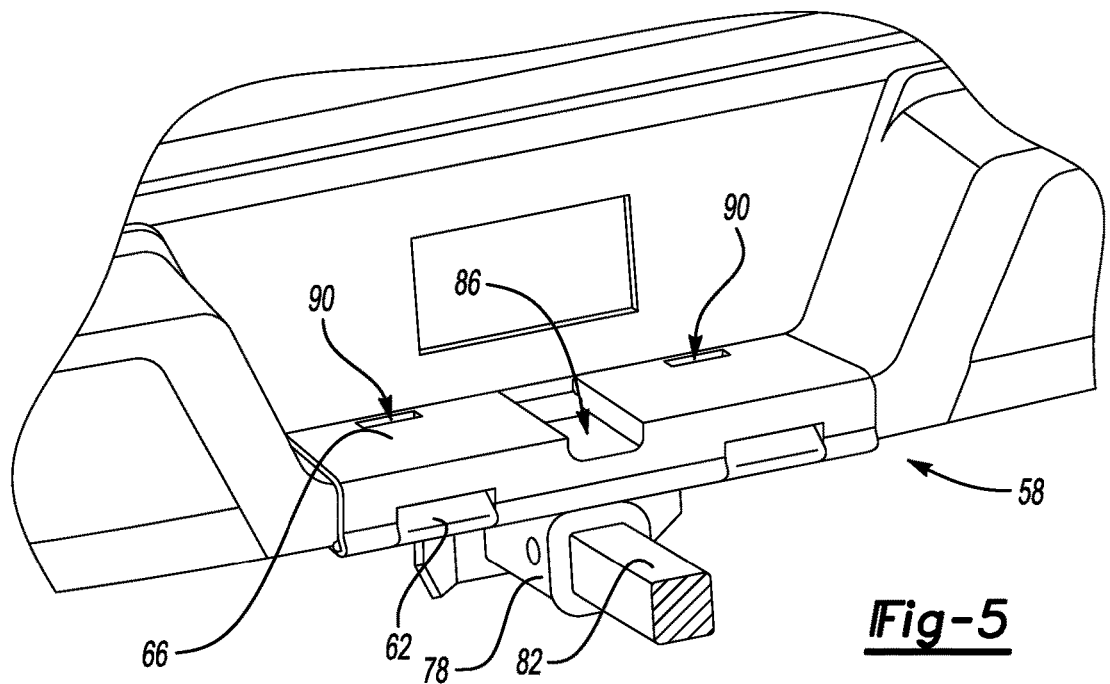
FIG. 5 illustrates a flip down step assembly of the pickup truck of FIG. 1 in a stowed position.
Figure 6:
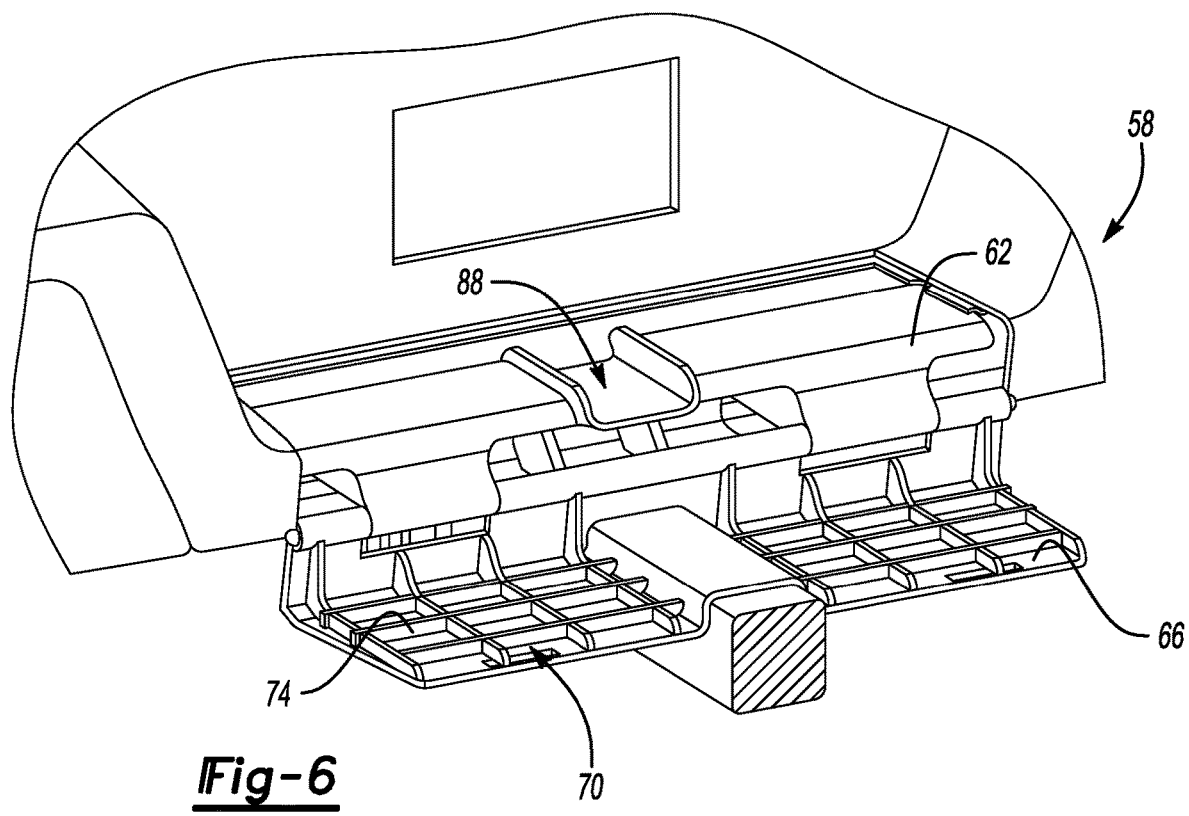
FIG. 6 illustrates the flip down step assembly of FIG. 5 in a flipped position.

In this example, the bumper step 50 can be utilized in connection with a step assembly 58 as shown in FIGS. 5 and 6. The step assembly 58 includes, in this example, a support bracket 62 and a flip step 66. The support bracket 62 can securely attach the step assembly 58 to the bumper 54 at the bumper step 50. The flip step 66 is pivotably connected to the support bracket 62.

The flip step 66 can pivot relative to the support bracket 62 from the stowed position of FIG. 5 to the flipped position of FIG. 6. In the flipped position, an underside 70 of the flip step 66 is presented to the user 42. The underside 70 can be used by the user 42 as a step surface.

In the flipped position, the underside 70 is vertically lower than a step surface provided by the bumper step 50. The user 42, particularly a user having a small stature, can place their foot on the underside 70 of the flip step 66 in the flipped position of FIG. 6. From the flip step 66, the user can then step onto the bumper step 50 or step into the cargo bed 14 utilizing the bumper step 50.

In this example, the underside 70 includes a ribbed support structure 74 that can help prevent the user 42 slipping on the underside 70 when stepping on the flip step 66.

In the example of FIGS. 5 and 6, a trailer hitch 78 of the vehicle 10 is coupled to a trailer hitch 82 of a trailer. The flip step 66 includes a channel 86 that receives at least a portion of the trailer hitch 82 when the flip step 66 is in the flipped position. Receipt of the trailer hitch 82 can help to stabilize the flip step 66 and present the underside 70 as a stepping surface at a position vertically lower than an uppermost surface of the trailer hitch 82 of the trailer.

The support bracket 62 of the step assembly 58 further includes a channel 88 that provides an area for the channel 86 of the flip step 66 to nest within when the flip step 66 is in the stowed position of FIG. 5.

The flip step 66, in the example embodiment, further includes locking tabs 90 that lock the flip step 66 in the stowed position. The flip step 66 can be locked in the stowed position when not in use. The user 42 can unlock the locking tabs 90 when moving the flip step 66 from the stowed position to the flipped position is desired.

Figure 7:
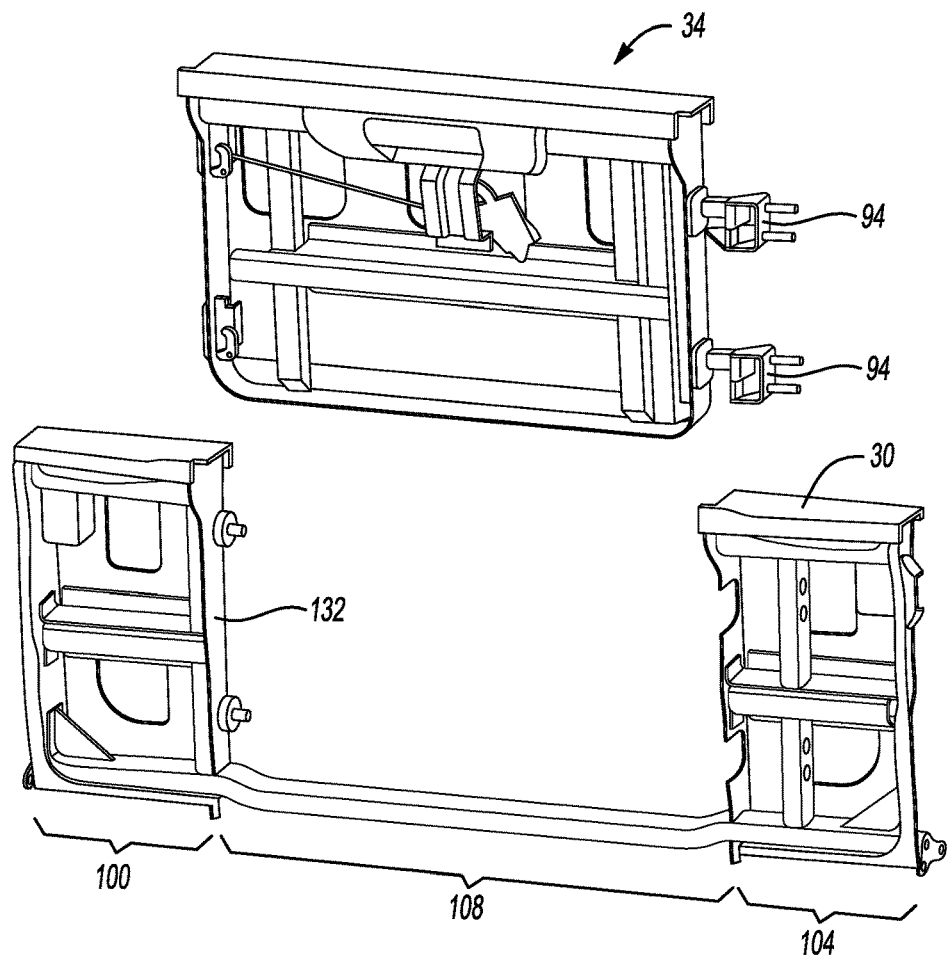
FIG. 7 illustrates an expanded view of selected portions of the tailgate assembly of FIG. 1.
Figure 8:
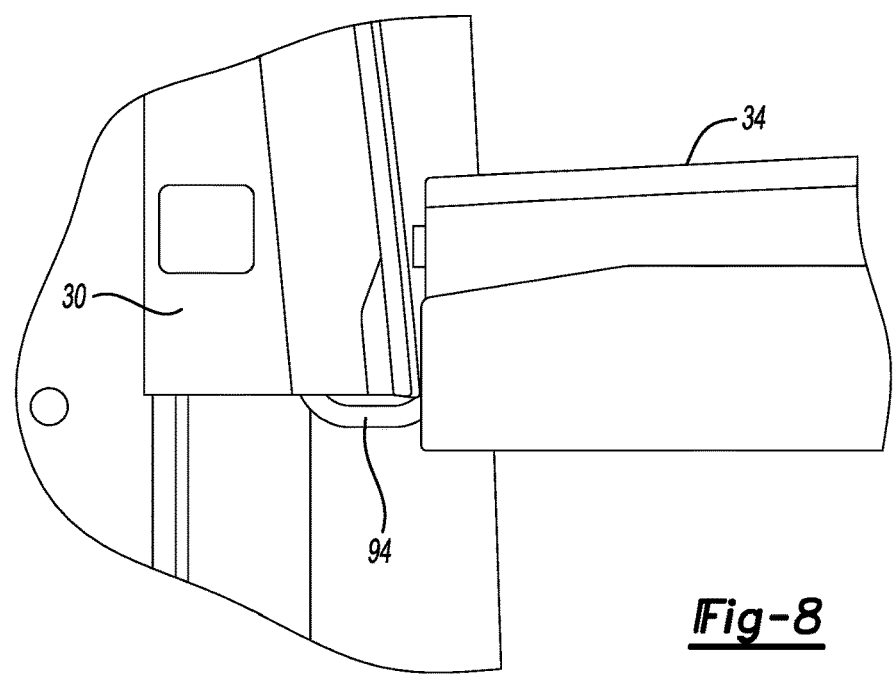
FIG. 8 illustrates a top view of selected portions of the tailgate assembly of FIG. 1.
Figure 9:
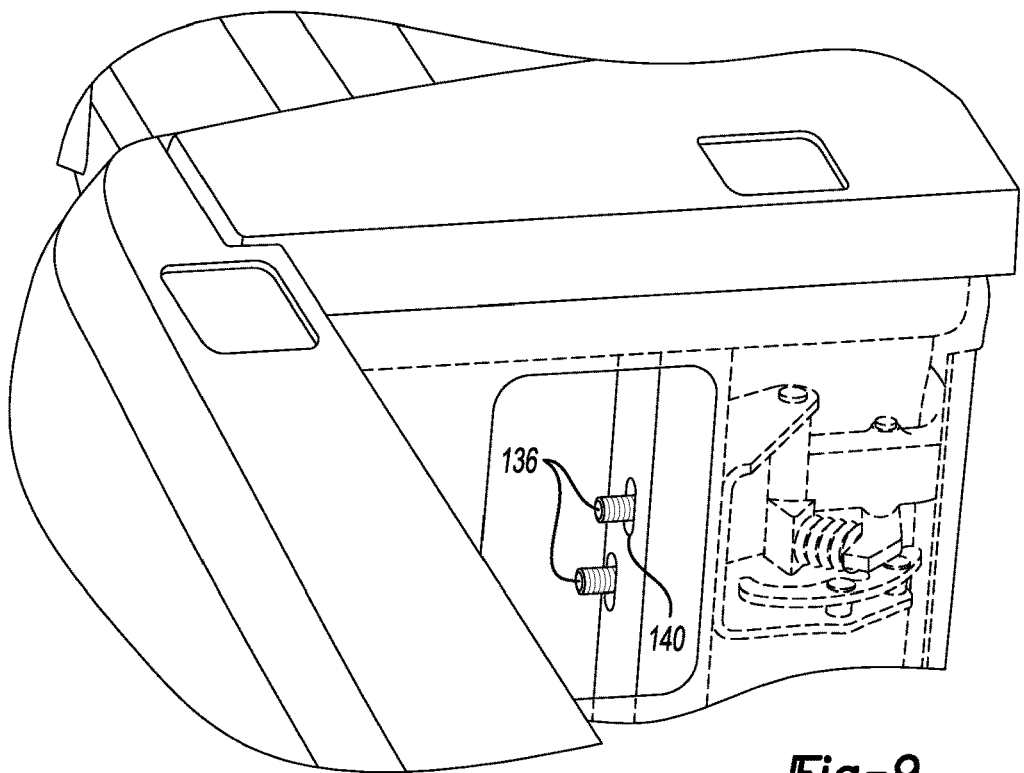
FIG. 9 illustrates a perspective view of selected portions of the tailgate assembly of FIG. 1.

With reference now to FIGS. 7 and 8, the door sub-assembly 34 is pivotably coupled to the frame sub-assembly 30 via two hinges 94, which are gooseneck hinges in this example. The hinges 94 can permit the door sub-assembly 34 to pivot relative to the frame sub-assembly 30 well away from the cargo bed access opening O. The hinges 94 can include two door check positions, say 45 and 90 degrees.

The frame sub-assembly 30 includes, among other things, a driver side section 100, a passenger side section 104, and a connection member 108. These pivot together when the frame sub-assembly 30 is moved between the tailgate closed position and the tailgate open position. The connection member 108, notably, dips vertically downward to help the keep the connection member 108 below the floor 38 of the cargo bed 14.

As shown in FIG. 1, the driver side section 100 includes an outer panel 112, and the passenger side section 104 includes an outer panel 116. When the tailgate assembly 26 is in the tailgate closed position of FIG. 1, the panels 112 and 116 can be viewed by an individual standing behind the vehicle 10. The connection member 108, however, is concealed behind the bumper 54, a fascia 120, or some combination of these.

The door sub-assembly 34 includes an outer panel 124 that is also visible when the tailgate assembly 26 is in the tailgate closed position of FIG. 1. Notably, no portion of the panel 112 or the panel 116 laterally overlaps with the door outer panel 24. In particular, the panel 112 does not include a section extending vertically beneath the panel 124 of the door sub-assembly 34, and the passenger side panel 116 does not include a section extending vertically beneath the panel 124 of the door sub-assembly 34. Instead, the door sub-assembly 34 is incorporated into the tailgate assembly 26 utilizing only two split lines 128 extending vertically across the tailgate assembly 26. Thus, the door sub-assembly 34 is incorporated into the tailgate assembly 26 with relatively little aesthetic disruption.

The support structures within the tailgate assembly 26 can include a plurality of tubular beam members 132 as shown in FIG. 7. The connection member 108 is a tubular support beam in this example. The connection member 108 can be considered a tie beam. From time to time, the user 42 may choose to decouple the door sub-assembly 34 from the tailgate assembly 26. This may be useful if the vehicle 10 is used to haul a trailer, such as a gooseneck trailer. Removing the door sub-assembly 34 can help with visibility when aligning the trailer to the vehicle 10, for example.

The hinges 94 can threadably connect to at least one of the beam members 132 when coupling the door sub-assembly 34 to the frame sub-assembly 30 through the hinges 94. In this example, threaded posts 36 of the hinges 194 extend through openings 140 in at least one of the beam members 132. A nut (not shown) can then be torqued down onto the threaded post 136 to secure the respective hinge 94 relative to the frame sub-assembly 30. The openings 140 can be oversized to permit alignment of the hinges 94 relative to the frame sub-assembly 30, which can facilitate controlling gaps and margins between the frame sub-assembly 30 and door sub-assembly 34.

Figure 10:
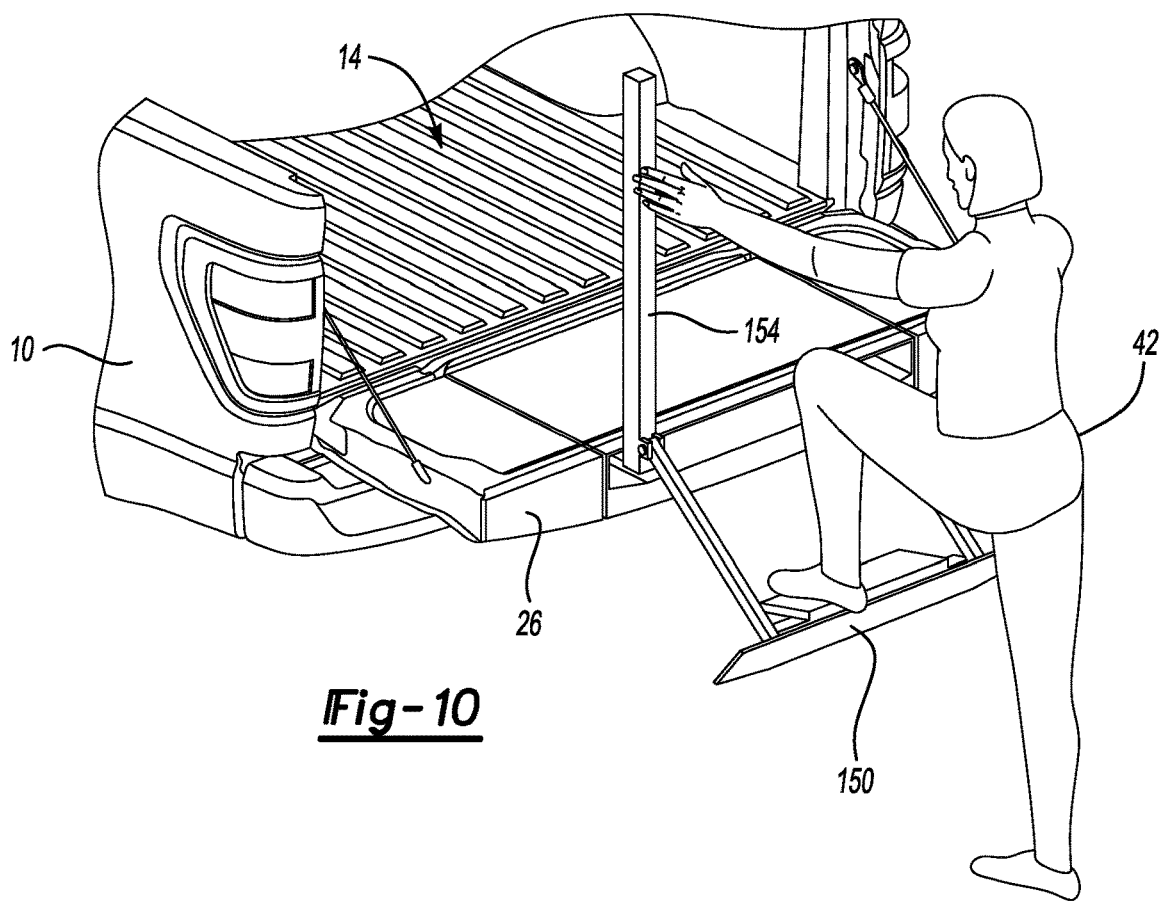
FIG. 10 illustrates a perspective view of a tailgate step of the tailgate assembly of FIG. 1.

The door sub-assembly 34 can be used in connection with a tailgate step 150 and grab handle 154 shown in FIG. 10. When the tailgate assembly 26 is in the tailgate open position, the user 42 can position the tailgate step 150 into a stepping position and then use the tailgate step 150 to enter the cargo bed 14.

The tailgate step 150 can be moved to a stowed position when not in use. The tailgate step 150 can at least partially retract within the door sub-assembly 34 when in the stowed position. Similarly, the grab handle 154 can be pivoted to stowed position when not in use.

The tailgate step 150 can be a commonly designed tailgate step that is used in connection with the tailgate assembly 26 having the door sub-assembly 34 and another tailgate assembly that does not include a door sub-assembly. This can, among other things, reduce overall build complexity and reduce costs.

Figure 11:
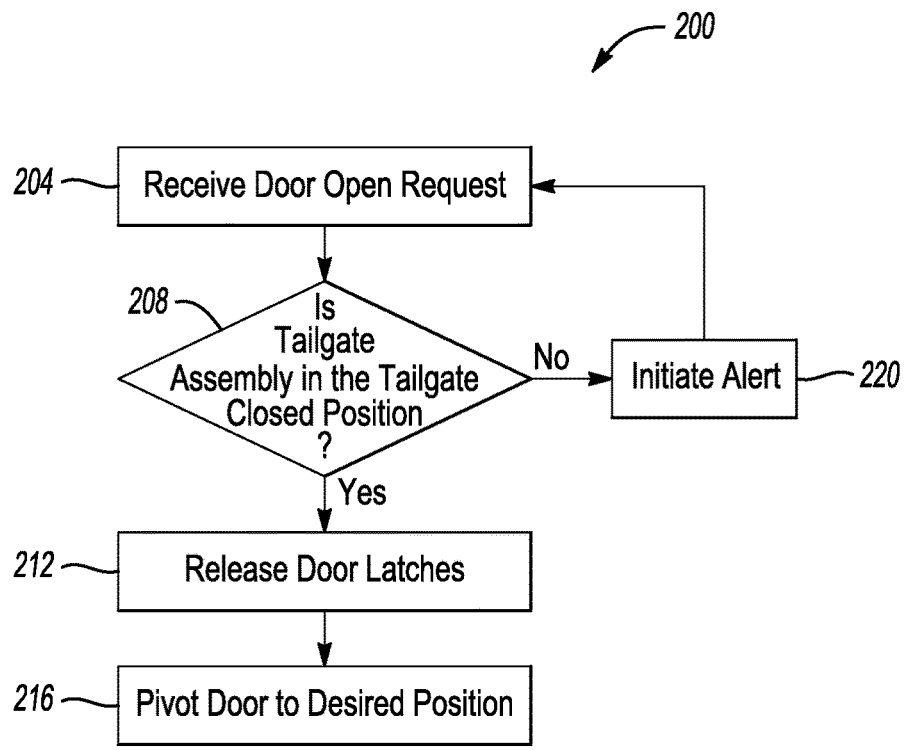
FIG. 11 illustrates a first example method of controlling the tailgate assembly of FIG. 1.

With reference now to FIG. 11, a method 200 of controlling the tailgate assembly 26 of FIGS. 1-4 helps to ensure that the door sub-assembly 34 is moved to the door open position when the tailgate assembly 26 is in the tailgate closed position, but not when the tailgate assembly 26 is in the tailgate open position. This method 200 can help to avoid damage resulting from the door sub-assembly 34 transitioning to the door open position when the tailgate assembly 26 is, for example, in the tailgate open position.

During ordinary operation of the vehicle 10, the tailgate assembly 26 is in the closed tailgate position of the FIG. 1, and the door sub-assembly 34 is in closed position. At the step 204, the vehicle 10 receives a door open request. The user 42 may press a button on a handle 160 to initiate the door open request. The door open request could instead be initiated from a keyfob, or by pressing a button within a cabin of the vehicle 10.

At a step 208, the method 200 then assesses whether or not the tailgate assembly 26 is in the tailgate closed position. The assessment can include checking the status of powered latches that hold the tailgate assembly 26 in the tailgate closed position. If the powered latches indicate a closed state, the method 200 proceeds to a step 212 where the powered latches are commanded open. The method 200 then pivots the door sub-assembly 34 to the door open position. The pivoting of the door sub-assembly 34 could be automatic or could be a manual pivoting by the user 42.

If, at the step 208, the method 200 assesses that the tailgate assembly 26 is not in the tailgate closed position, the method 200 moves from the step 208 to a step 220. At the step 220, the method 200 initiates a user alert, such as an audible chime. The alert can notify the user 42 about the state of the tailgate assembly 26. The user 42 can then address the issue by moving the tailgate assembly 26 to the closed tailgate position. The method 200 moves from the step 220 to the step 204.

Figure 12:
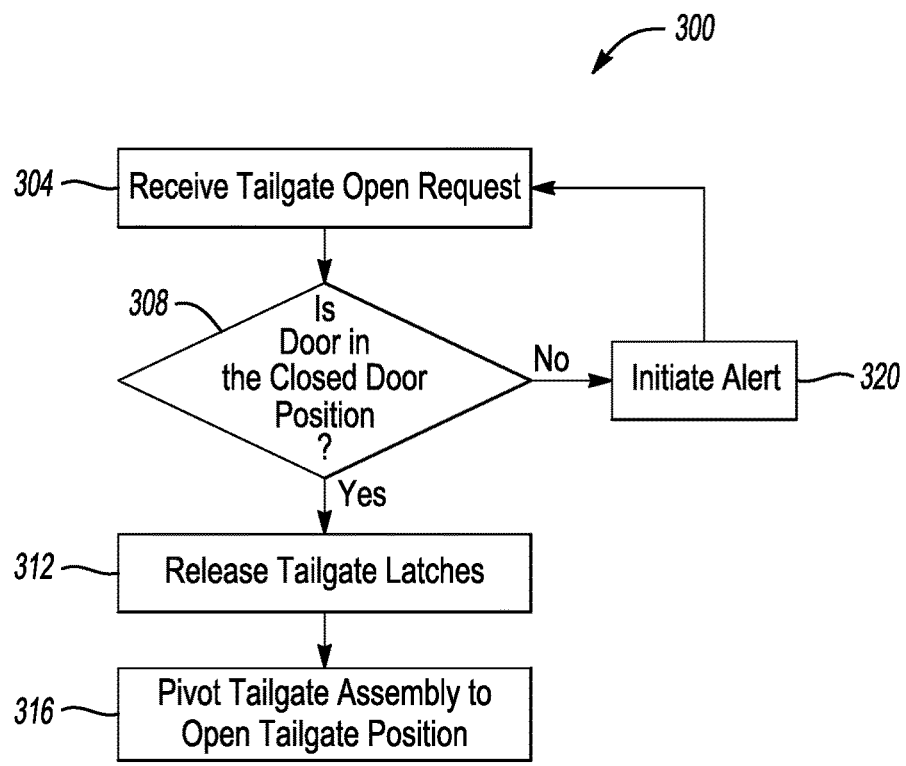
FIG. 12 illustrates a second example method of controlling the tailgate assembly of FIG. 1.

With reference now to FIG. 12, a method 300 of controlling the tailgate assembly 26 of FIGS. 1-4 helps to ensure that the tailgate assembly 26 is moved to the tailgate open position when the door sub-assembly 34 is in the door open position, but not when the tailgate assembly 26 is in the tailgate open position. The method 300 can help to avoid damage resulting from the tailgate assembly 26 transitioning to the tailgate open position when the door sub-assembly 34 is in the door open position.

During ordinary operation of the vehicle 10, the tailgate assembly 26 is in the closed tailgate position of the FIG. 1, and the door sub-assembly 34 is in the door closed position. At the step 304, the vehicle 10 receives a tailgate open request. The user 42 may press a button on a handle 164 to initiate the tailgate open request. The door open request could instead be initiated from a keyfob, or by pressing a button within a cabin of the vehicle 10.

At a step 308, the method 300 then assesses whether or not the door sub-assembly 34 is in the door closed position. The assessment can include checking the status of powered latches that hold the door sub-assembly 34 in the door closed position. If these powered latches indicate a closed state, the method 300 proceeds to a step 312 where the method 200 releases tailgate latches that hold the tailgate assembly 26 in the closed tailgate position. The method 300 then moves to the step 316 where the tailgate assembly 26 is pivoted to the open tailgate position. The pivoting of the tailgate assembly 26 could be automatic or could be a manual pivoting by the user 42.

If, at the step 308, the method 300 assesses that the door sub-assembly 34 is not in the door closed position, the method 300 moves from the step 308 to a step 320. At the step 320, the method 300 initiates a user alert, such as an audible chime. The user alert notifies the user 42 about the state of the door sub-assembly 34. The user 42 can then address the issue by moving the door sub-assembly 34 to the door closed position. The method 300 moves from the step 320 to the step 304.

Features of the disclosed examples can include a tailgate assembly having a door that can be opening to access a cargo box while maintaining existing functionality of a bumper step. The door can be removed and stored for fifth wheel hitching.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly for a vehicle comprising:
a frame sub-assembly that includes a driver side section, a passenger side section, and a connection member coupling the driver side section to the passenger side section;
a door sub-assembly disposed between the driver side section and the passenger side section;
the door sub-assembly and the frame sub-assembly pivotable together about a first axis between a tailgate closed position and a tailgate open position;
the door sub-assembly pivotable relative to the frame sub-assembly about a second axis between a door closed position and a door open position; and
the door sub-assembly in the door open position providing a cargo bed access opening that extends vertically downward at least as far as a floor of the cargo bed.

2. The tailgate assembly of claim 1, wherein the first axis is transverse to the second axis.

3. The tailgate assembly of claim 2, wherein the first axis is a horizontally extending axis and wherein the second axis is a vertically extending axis.

4. The tailgate assembly of claim 1, wherein the tailgate is vertically aligned when in the tailgate closed position, wherein the tailgate is horizontally aligned when in the tailgate open position.

5. The tailgate assembly of claim 1, wherein the driver side section includes a driver side outer panel, the passenger side section includes a passenger side outer panel, and the door sub-assembly includes a door outer panel, wherein no portion of the door outer panel horizontally overlaps with any portion of the driver side outer panel or the passenger side outer panel.

6. The tailgate assembly of claim 1, further comprising a tailgate step at least partially retractable within the door sub-assembly, the tailgate step extendable to a stepping position when the door sub-assembly and the frame sub-assembly are in the tailgate open position.

7. The tailgate assembly of claim 1, further comprising a bumper step, wherein a longitudinal centerline of the vehicle extends through the bumper step and the cargo bed access opening.

8. The tailgate assembly of claim 1, further comprising a step assembly having a flip step moveable between a stowed position and a flipped position, the flip step in the flipped position providing a step surface for a user.

9. The tailgate assembly of claim 8, wherein the flip step includes ribbed support structure on the step surface.

10. The tailgate assembly of claim 8, wherein the flip step includes a channel configured to receive at least a portion of a trailer hitch when the flip step is in the flipped position.

11. The tailgate assembly of claim 8, wherein the step assembly having the flip step is adjacent a bumper step.

12. The tailgate assembly of claim 1, wherein at least one gooseneck hinge pivotably connects the door sub-assembly to the frame sub-assembly.

13. The tailgate assembly of claim 1, further comprising a tailgate step that at least partially retracts within the door-subassembly when in a stowed position.

14. The tailgate assembly of claim 1, wherein the door sub-assembly includes a handle and button that is actuated to initiate a door open request, wherein the door-sub assembly further includes a button that is actuated to initiate a tailgate open request.

15. A method of providing access to a cargo bed of a vehicle, the method comprising:
providing a tailgate assembly that includes a door sub-assembly and a frame sub-assembly; and
pivoting the door sub-assembly relative to the frame sub-assembly to provide a cargo bed access opening, the cargo bed access opening extending vertically downward at least as far as a floor of the cargo bed.

16. The method of claim 15, further comprising unlatching the door sub-assembly from the frame sub-assembly to permit the pivoting.

17. The method of claim 16, further comprising permitting the unlatching when the tailgate assembly is in a tailgate closed position and preventing the unlatching when the tailgate is in a tailgate open position.

18. The method of claim 15, further comprising permitting the tailgate assembly to pivot from a tailgate closed position to a tailgate open position when the door sub-assembly is in the door closed position, and preventing the tailgate assembly from pivoting from the tailgate closed position to the tailgate open position when the door sub-assembly is in the door open position.

19. The method of claim 15, further comprising, when the door-subassembly is in a door closed position, pivoting the tailgate assembly to a tailgate open position, and extending a tailgate step from a stowed position into a stepping position, the tailgate step in the stowed position at least partially retracted within the door-subassembly.

* * * * *

UNITED STATES PATENT AND TRADEMARK OFFICE
CERTIFICATE OF CORRECTION

PATENT NO. : 11,325,451 B2
APPLICATION NO. : 16/918335
DATED : May 10, 2022
INVENTOR(S) : Adrian Nania and Amol Borkar It is certified that error appears in the above-identified patent and that said Letters Patent is hereby corrected as shown below:

In the Claims

In Claim 1, Column 7, Line 62; replace "the cargo bed" with --a cargo bed--

In Claim 4, Column 8, Line 1; replace "The tailgate" with --a tailgate--

In Claim 13, Column 8, Line 37; replace "door-subassembly" with --door sub-assembly--

In Claim 14, Column 8, Line 40; replace "door-subassembly" with --door sub-assembly--

In Claim 17, Column 8, Line 55; replace "the tailgate" with --a tailgate--

In Claim 17, Column 8, Line 56-57; replace "the tailgate" with --a tailgate--

In Claim 19, Column 8, Line 66; replace "door-subassembly" with --door sub-assembly--

In Claim 19, Column 9, Line 3; replace "door-subassembly" with --door sub-assembly--

Signed and Sealed this
Second Day of August, 2022

Katherine Kelly Vidal
*Director of the United States Patent and Trademark Office*